United States Patent Office 3,252,942
Patented May 24, 1966

3,252,942
PROCESS FOR POLYMERIZATION OF ISOCYANATES
Harold France and Donald Lees, Manchester, England, assignors to Imperial Chemical Industries Limited, London, England, a corporation of Great Britain
No Drawing. Filed Oct. 13, 1961, Ser. No. 144,832
Claims priority, application Great Britain, Oct. 20, 1960, 36,005/60
12 Claims. (Cl. 260—77.5)

This invention relates to improvements in or relating to the manufacture of polymers, more particularly to the polymerisation of organic isocyanates.

It is already known to polymerise organic isocyanates using basic compounds as polymerisation catalysts. Thus the use of alkali and alkaline earth metal oxides, hydroxides, carbonates, alcoholates and phenates, alkali metal salts of enolisable compounds and metallic salts of weak aliphatic and alicyclic carboxylic acids as polymerisation catalysts is described in U.K. specification No. 809,809.

It has now been found that organic isocyanates may be polymerised with exceptional rapidity to give valuable polymeric products when certain basic polymerisation catalysts are used in conjunction with a mono-N-substituted carbamic ester.

Thus according to the present invention there is provided an improved process for the polymerisation of organic isocyanates by treating said isocyanates with a catalyst selected from the group comprising alkali and alkaline earth metal oxides, hydroxides, carbonates, alcoholates and phenates, alkali metal salts of enolisable compounds and metallic salts of weak organic carboxylic acids, characterised in that said polymerisation is carried out in the presence of a mono-N-substituted carbamic ester.

Examples of catalysts which may be used in the process of this invention include sodium methoxide, potassium hydroxide, sodium acetate, potassium acetate, sodium benzoate, sodium and potassium carbonate, sodium phenate, sodium octyl phenate, sodio-acetoacetic ester, sodium stearate, sodium 2-ethylhexoate, lead 2-ethylhexoate, lead laurate, zinc naphthenate, lead naphthenate, cobalt naphthenate, manganese linoleate, calcium naphthenate, lead benzoate and barium-2-ethylhexoate.

Particularly valuable catalysts are lead naphthenate, lead-2-ethyl hexoate and calcium naphthenate. Mixtures of catalysts may be used.

Examples of mono-N-substituted carbamic esters for use in the process of the present invention include the esters of phenyl carbamic acid and substitution products thereof, tolylene-2:4-bis-carbamic acid, tolylene-2:6-bis carbamic acid, 1:3 and 1:4-phenylene-bis-carbamic acids, hexamethylene-1:6-bis-carbamic acid and chlorophenylene-2:4-bis-carbamic acid with alcohols and phenols. It is preferred to use esters of phenols.

It is particularly preferred to make use of a mono-N-substituted carbamic ester formed in situ by the addition of an alcohol or a phenol to the isocyanate or mixture of isocyanates to be polymerised. Examples of alcohols or phenols that may be added include methanol, ethanol, propanol, isopropanol and higher aliphatic alcohols, cyclohexanol, benzyl alcohol and substitution products thereof, phenol, cresols, xylenols and substitution products thereof, and polyhydric alcohols and phenols such as ethylene glycol, 1:4-butylene glycol, diethylene glycol, glycerol and catechol.

The polymerisation process may be carried out in the absence or presence of a solvent for the isocyanate. Suitable solvents are esters such as ethyl acetate and butyl acetate, ketones such as acetone and methyl ethyl ketone, chloroform, benzene, toluene, xylene, monochlorbenzene, o-dichlorbenzene, ethers such as diethyl and dibutyl ether and petroleum ethers or mixtures thereof. Ordinarily, a solvent is used in which the polymerised isocyanate is soluble. When the requisite degree of polymerisation has been achieved, further polymerisation may be prevented for example by mechanical removal of insoluble catalysts by filtration, this procedure being particularly convenient where the product is in solution. It is preferred, especially in the case of soluble catalysts, to render the catalyst inactive by treating the product with the calculated amount, or a slight excess thereof, of a strong acid such as anhydrous hydrogen chloride, sulphuric acid or phosphoric acid. If desired, the inactive insoluble matter so produced may be removed by filtration.

The solvent may also be chosen, wherein both isocyanate and catalyst are soluble, for example petroleum ethers, diethyl and dibutyl ether, so that the polymerised isocyanate separates from the reaction mixture.

The proportion of catalyst required depends upon the activity of the catalyst and the nature of the isocyanate. Amounts within the range 0.01 to 10.0% of the isocyanate are generally found useful; in the case of catalysts of high activity, about 0.1% to 1% is suitable.

The proportion of mono-N-substituted carbamic ester used is normally from 0.05% to 5% by weight and preferably from 0.2% to 2.0% by weight of the isocyanate to be polymerised.

The temperatures employed for the reaction may vary widely, and are usually in the range of from 15° C. to 250° C.; preferably temperatures of from 15° C. to 75° C. are used. If too high a temperature is used, undesirable side-reactions and discolouration of the product occurs.

Any organic isocyanate or mixture of isocyanates may be polymerised according to the process of the present invention. Examples of such isocyanates are p-Phenylene diisocyanate,
1-methoxyphenylene-2:4-diisocyanate,
3:3'-dimethyl-4:4'-diisocyanatodiphenylmethane,
Diphenylene-4:4'-diisocyanate,
4:4'-diisocyanatodiphenyl ether,
Naphthylene-1:5-diisocyanate,
Hexamethylene diisocyanate,
Diisocyanato-dicyclohexylmethane,
p-Xylylene diisocyanate,
Isocyanatobenzyl isocyanates,
1:2:3:4:5:6-hexahydrodiphenylene-4:4'-diisocyanate,
4:4'-diisocyanate-1:2:3:4:5:6-hexahydrodiphenylmethane,
1:2:3:4-tetrahydronaphthylene-1:5-diisocyanate,
Toluene-2:4:6-triisocyanate,
3-methyl-4:6:4'-triisocyanatodiphenylmethane,
2:4:4'-triisocyanatodiphenyl,
2:4:4'-triisocyanatodiphenyl ether and liquid polyisocyanate compositions obtained by phosgenating the polyamines obtained by condensing formaldehyde with a mixture of at least two aromatic amines as described in U.K. patent specification 842,154. Isocyanates containing two or more isocyanate groups per molecule may be polymerised in admixture with aromatic mono-isocyanates such as phenyl isocyanate, tolyl isocyanates, chlorphenyl isocyanates or methoxyphenyl isocyanates. Organic diisocyanates that may especially advantageously be polymerised according to the process of the present invention are 2:4- and 2:6-tolylene diisocyanates and mixtures thereof, diisocyanatodiphenylmethane, m-phenylene diisocyanate, chlorophenylene-2:4-diisocyanate, m-xylylene diisocyanate and p-isocyanatobenzyl isocyanate and hexamethylene diisocyanate.

The polymerisation products of the process of this invention are compounds containing isocyanurate rings. By varying the degree of polymerisation and the number of isocyanate groups in the monomeric isocyanate or mixture of isocyanates. polymerisation products of varying isocyanate functionality may be prepared. The polymerisation products may be used as more fully described in the prior art. Thus they may be used for example in the presence or absence of solvents and/or other isocyanates for reacting with polyester or polyether resins or the isocyanate reaction products thereof, in the manufacture of polyurethane products such as rigid and flexible foams, solid elastomers, adhesives and surface coatings.

The invention is illustrated but not limited by the following examples in which parts and percentages are by weight.

Example 1

A mixture of 75 parts of tolylene-2:4-diisocyanate, 75 parts of ethyl acetate, 0.45 part of phenol and 0.45 part of a solution of calcium naphthenate in white spirit containing 4% calcium are stirred at 55° C. in an atmosphere of dry nitrogen for 6 hours. The yellow solution obtained has an isocyanate content of 11.04% calculated as NCO groups, that is 45.7% of the original NCO content, and its infra-red spectrum shows strong absorption bands at 5.85 and 7.05 microns, characteristic of a triaryl isocyanurate. Repetition of the above procedure with the omission of phenol results in a product having an isocyanate content at the end of 6 hours of 19.23% or 79.6% of the original NCO content.

Example 2

A mixture of 75 parts of an approximately 80:20 mixture of tolylene-2:4- and 2:6-diisocyanates, 75 parts of ethyl acetate, 0.5 part of a solution of calcium naphthenate in white spirit (calcium content 4%) and 0.5 part of methyl alcohol is heated in an atmosphere of dry nitrogen at 75° C. for 4 hours. The solution of polymerised isocyanate then has an isocyanate content of 10.0% NCO groups or 41.4% of the original value. Repetition of the above procedure without the addition of methyl alcohol results in a product with an isocyanate content after 4 hours of 16.9% NCO groups or 70% of the original NCO content, the polymerisation having proceeded at a much slower rate.

Example 3

A mixture of 50 parts 2:4/2:6-tolylene diisocyanate of isomer ratio 65:35, 50 parts ethyl acetate, 0.4 part methanol and 0.554 part of a solution of lead 2-ethylhexoate in white spirit containing 25% lead is heated under a reflux condenser in a bath at 90° C. while excluding moisture. After 3 hours' heating, the isocyanate group content of the solution fell from 23.1% to 13.7%.

When the experiment is repeated but omitting the methanol, the isocyanate group content fell from 23.7% to 19.0% in the same time.

Example 4

Using the procedure of Example 4 but replacing 0.4 part methanol by 1.2 parts phenol, the isocyanate group content of the solution fell from 22.9% to 10.9% in 3 hours. When phenol was omitted, the isocyanate group content fell from 23.7% to 19.1% in the same time.

Example 5

A mixture of 150 parts 2:4-tolylene diisocyanate, 225 parts ethyl acetate, 0.3 part phenol and 0.136 part of an exclusion of manganese naphthenate in white spirit containing 6% manganese is stirred under nitrogen with solution of moisture and heated to 45° C. over ½ hour. Thereafter the reaction became exothermic and the temperature rose to 52° C. without external heating. When the reaction ceased to be exothermic, the mixture was heated at 45° C. for 3½ hours and finally at 55° C. for 1 hour. The polymerisation was terminated by addition of 0.106 part phosphoric acid as a 4% w./v. solution in ethyl acetate. The resulting pale orange-brown solution contained 6.45% isocyanate groups.

Example 6

A mixture of 130 parts hexamethylene diisocyanate containing 49.0% isocyanate groups, 0.65 part phenol and 0.65 part of a solution of lead naphthenate in white spirit containing 24% lead was stirred under a dry nitrogen atmosphere with exclusion of moisture and the temperature raised to 48–50° C. in the course of ½ hour. After 1½ hours at this temperature the isocyanate group content of the syrupy liquid is 29.7%. If the experiment is repeated without the presence of phenol the isocyanate group content is 42.6% after the same period of heating at 48–50° C.

What we claim is:

1. A process for the polymerization of at least one organic isocyanate by heating said isocyanate at a temperature of from 15° C. to 250° C. in the presence of (1) a catalyst selected from the group consisting of calcium naphthenate, lead 2-ethylhexoate, manganese naphthenate and lead naphthenate and (2) a mono-N-substituted carbamic ester admixed with said isocyanate in an amount of from 0.05 to 5% by weight of said isocyanate, the amount of said catalyst being within the range from 0.01 to 10% of the weight of the isocyanate to be polymerized.

2. An improved process for the polymerization of organic isocyanates as claimed in claim 1 wherein the catalyst is lead naphthenate.

3. An improved process for the polymerization of organic isocyanates as claimed in claim 1 wherein the catalyst is lead 2-ethyl hexoate.

4. An improved process for the polymerization of organic isocyanates as claimed in claim 1 wherein the catalyst is calcium naphthenate.

5. An improved process for the polymerization of organic isocyanates as claimed in claim 1 wherein the mono-N-substituted carbamic ester is an ester of a phenol.

6. An improved process for the polymerization of organic isocyanates as claimed in claim 1 wherein the mono-N-substituted carbamic ester is formed in situ by the addition of a member of the group consisting of alcohols and phenols to the isocyanate to be polymerized.

7. An improved process for the polymerization of organic isocyanates as claimed in claim 1 in which the amount of said mono-N-substituted carbamic ester is 0.2 to 2% by weight of said isocyanate to be polymerized.

8. An improved process for the polymerization of organic isocyanates as claimed in claim 1 wherein the polymerization is carried out at a temperature of from 15° C. to 75° C.

9. An improved process for the polymerization of organic isocyanates as claimed in claim 1 wherein the organic isocyanate is a diisocyanate selected from the group consisting of 2:4- and 2:6-tolylene diisocyanates and mixtures thereof, diisocyanatodiphenyl methane, m-phenylene diisocyanate, chlorophenylene-2:4-diisocyanate, m-xylylene diisocyanate, p-isocyanato-benzyl isocyanate and hexamethylene diisocyanate.

10. An improved process for polymerization of organic isocyanate as claimed in claim 1, wherein the polymerization is carried out in a solvent for said isocyanate, said catalyst is soluble in said solvent, and said catalyst is inactivated to terminate the reaction by treating the product with about the calculated amount of a strong acid.

11. An improved process for the polymerization of organic isocyanates as claimed in claim 10 in which a slight excess of strong acid is used.

12. An improved process for the polymerization of organic isocyanates as claimed in claim 10 in which the strong acid is selected from the group consisting of anhydrous hydrogen chloride, sulfuric acid and phosphoric acid.

References Cited by the Examiner
UNITED STATES PATENTS

| | | | |
|---|---|---|---|
| 2,954,365 | 9/1960 | Windemuth et al. | 260—77.5 |
| 2,978,449 | 4/1961 | France et al. | 260—77.5 XR |

LEON J. BERCOVITZ, *Primary Examiner.*

NORMAN G. TORCHIN, *Examiner.*